(12) United States Patent
Reeves et al.

(10) Patent No.: US 8,482,540 B1
(45) Date of Patent: Jul. 9, 2013

(54) CONFIGURING A USER INTERFACE FOR USE WITH AN OVERLAY

(75) Inventors: Raymond Emilio Reeves, Olathe, KS (US); Ryan Alan Wick, Apollo Beach, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 291 days.

(21) Appl. No.: 13/008,675

(22) Filed: Jan. 18, 2011

(51) Int. Cl.
*G06F 3/041* (2006.01)

(52) U.S. Cl.
USPC .......................................... 345/173; 345/156

(58) Field of Classification Search
USPC ................................................ 345/156, 173
See application file for complete search history.

(56) References Cited

U.S. PATENT DOCUMENTS

| | | | |
|---|---|---|---|
| 5,875,311 A * | 2/1999 | Bertram et al. | 710/305 |
| 6,636,203 B1 * | 10/2003 | Wong et al. | 345/173 |
| 2003/0235452 A1 * | 12/2003 | Kraus et al. | 400/472 |
| 2007/0296709 A1 * | 12/2007 | GuangHai | 345/173 |
| 2008/0316180 A1 * | 12/2008 | Carmody et al. | 345/172 |
| 2010/0302168 A1 | 12/2010 | Giancarlo et al. | |

FOREIGN PATENT DOCUMENTS

WO 2008037275 A1 4/2008

OTHER PUBLICATIONS cre.ations.net—Creation: Vinyl overlay for tactile feel on iPhone NES emulator; Accessed Dec. 22, 2010 http://web.archive.org/web/20080420124015/http://cre.ations.net/creation/vinyl-overlay-for-tactile-feel-on-iphone-nes-emulator.
Nokia perfects the clicky tactile touchscreen!; Accessed Jul. 5, 2010 http://www.google.com/gwt/x?source=m &u=http%3A%2F%2Fwww.symbian-freak.com/n.

* cited by examiner

*Primary Examiner* — Kevin M Nguyen
*Assistant Examiner* — Sepideh Ghafari

(57) ABSTRACT

An overlay secured to a mobile device and positioned over a portion of a touch-activated user interface on the mobile device functions as a guide and includes input areas that indicate locations of input touch regions on the user interface. Based on an identity of the overlay, configuration data is accessed that corresponds to that particular overlay. The configuration data defines locations of the input areas and enables the input touch regions to be mapped for that particular overlay.

19 Claims, 11 Drawing Sheets

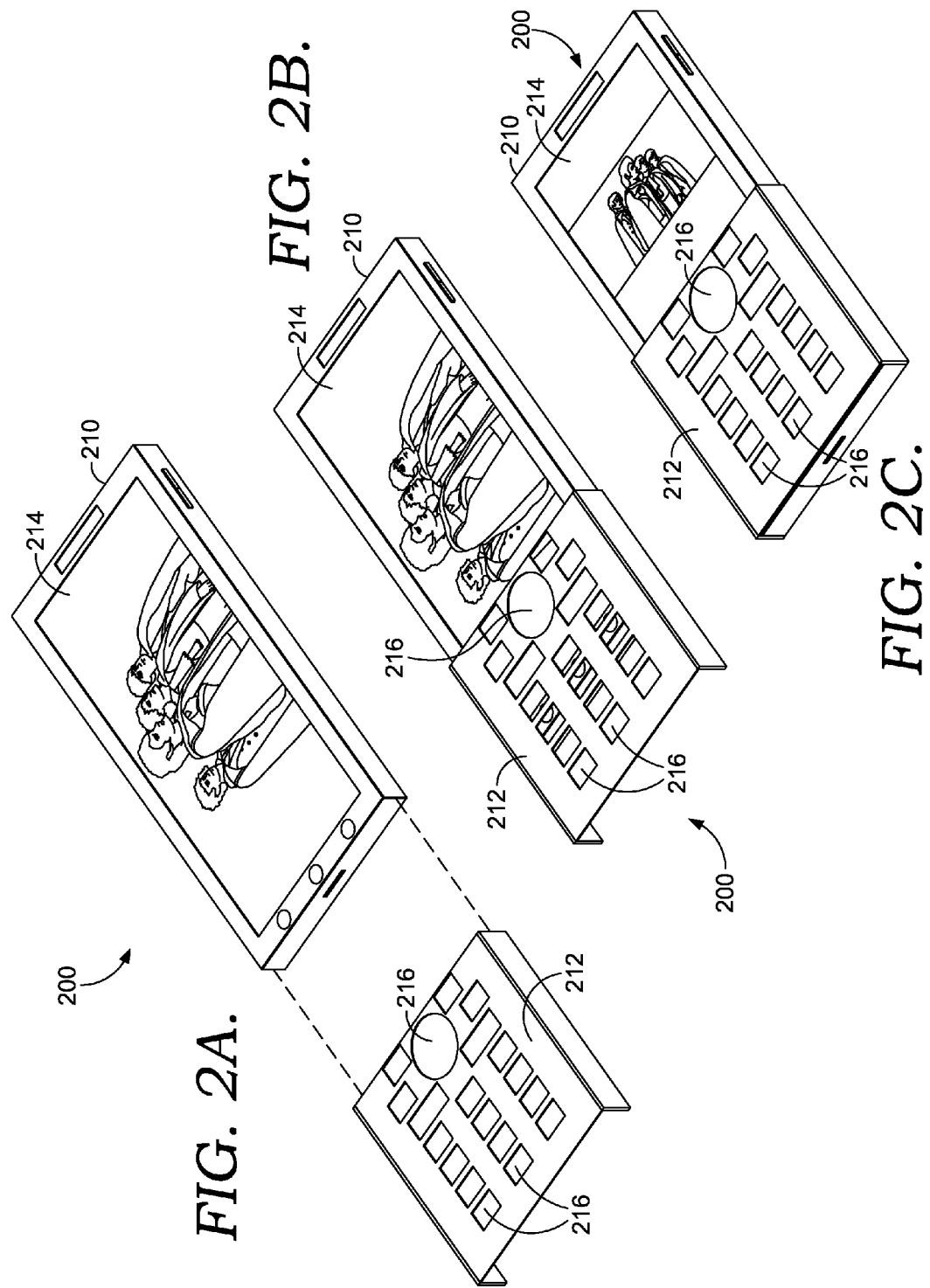

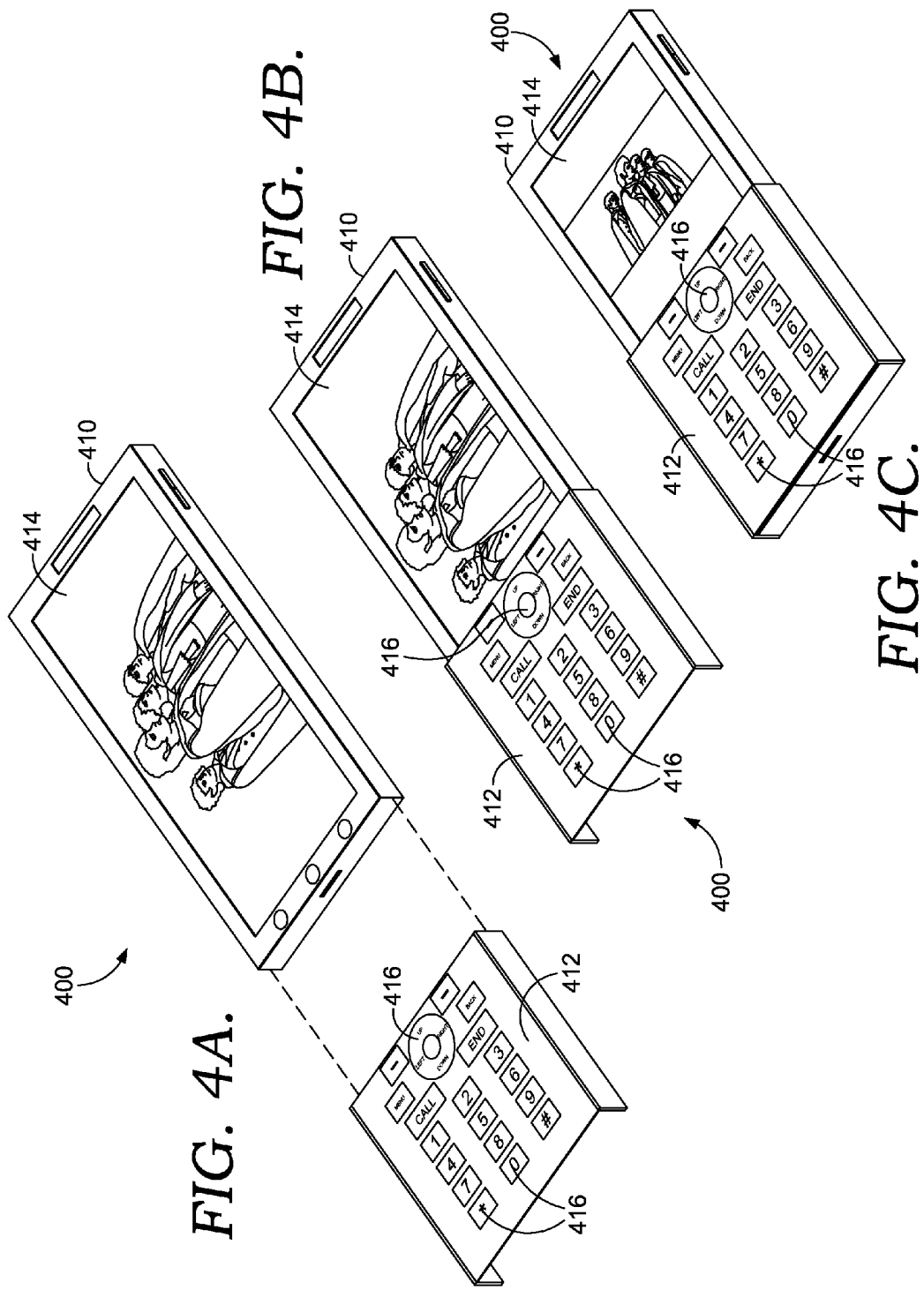

ical subject matter to the attached draw-
CONFIGURING A USER INTERFACE FOR USE WITH AN OVERLAY

CROSS-REFERENCE TO RELATED APPLICATIONS

This application is related by subject matter to the invention disclosed in the following U.S. patent application filed on even date herewith: U.S. application Ser. No. 13/008,733, entitled "INTEGRATED OVERLAY SYSTEM FOR MOBILE DEVICES," which is assigned or under obligation of assignment to the same entity as this application and which is herein incorporated by reference in its entirety.

SUMMARY

A high-level overview of various aspects of the invention is provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In a first aspect, a set of computer-useable instructions provide a method for interpreting input provided to a mobile device by way of a user interface of the mobile device. A physical overlay placed over a portion of the user interface is identified. Based on the overlay's identity, configuration data associated with the overlay is accessed. The configuration data defines locations of input areas on the overlay. Based on the configuration data, input regions of the user interface are mapped to input values such that when a user provides touch input by way of an input region, an input value associated with the input region is received by the mobile device. The location of the input region corresponds to the location of one of the input areas of the overlay.

In a second aspect, a system is provided for interpreting input provided to a mobile device by way of a user interface. The system includes an overlay having a plurality of input areas, where the input areas facilitate user interaction with the user interface by physically indicating locations of specific regions of the user interface. Specific functions are associated with the specific regions of the user interface. The system also includes a mobile device that is configured to identify the overlay, which is placed over a portion of the user interface. The mobile device is also configured to access configuration data associated with the overlay, based on the overlay's identity, map a region of the user interface to an input value, based on the configuration data, and map output data to a region of the user interface.

In a third aspect, a set of computer-useable instructions provide a method for interpreting input provided to a mobile device by way of a user interface. The method includes detecting attachment of a removable overlay to the mobile device, where the overlay covers a portion of the user interface. The overlay is identified, and based on the overlay's identity, configuration data associated with the overlay is accessed. The configuration data defines a mapping of user interface regions that are associated with a respective keypad input or a respective display region. A user input is received by way of a mapped region, where the mapped region corresponds to one of the input areas of the overlay. Based on the configuration data, the user input is translated to the keypad input associated with the mapped region. Data for display on the user interface is received from an application. Based on the configuration data, a display region of the user interface not obscured by the overlay is determined, and the data is displayed on the region of the user interface.

BRIEF DESCRIPTION OF THE SEVERAL VIEWS OF THE DRAWINGS

Illustrative embodiments of the present invention are described in detail below with reference to the attached drawing figures, and wherein:

FIGS. 2A, 2B, and 2C depict a system including a mobile device and an overlay in accordance with an embodiment of the present invention;

FIGS. 4A, 4B, and 4C depict a system including a mobile device and an overlay in accordance with an embodiment of the present invention;

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Further, various technical terms are used throughout this description. An illustrative resource that fleshes out various aspects of these terms can be found in Newton's Telecom Dictionary, 25th Edition (2009).

Embodiments of the invention may take the form of, among other things: a method, system, or set of instructions embodied on one or more computer-readable media. Computer-readable media include both volatile and nonvolatile media, removable and nonremovable media, and contemplate media readable by a computing device. Computer-readable media include any media that are useable for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
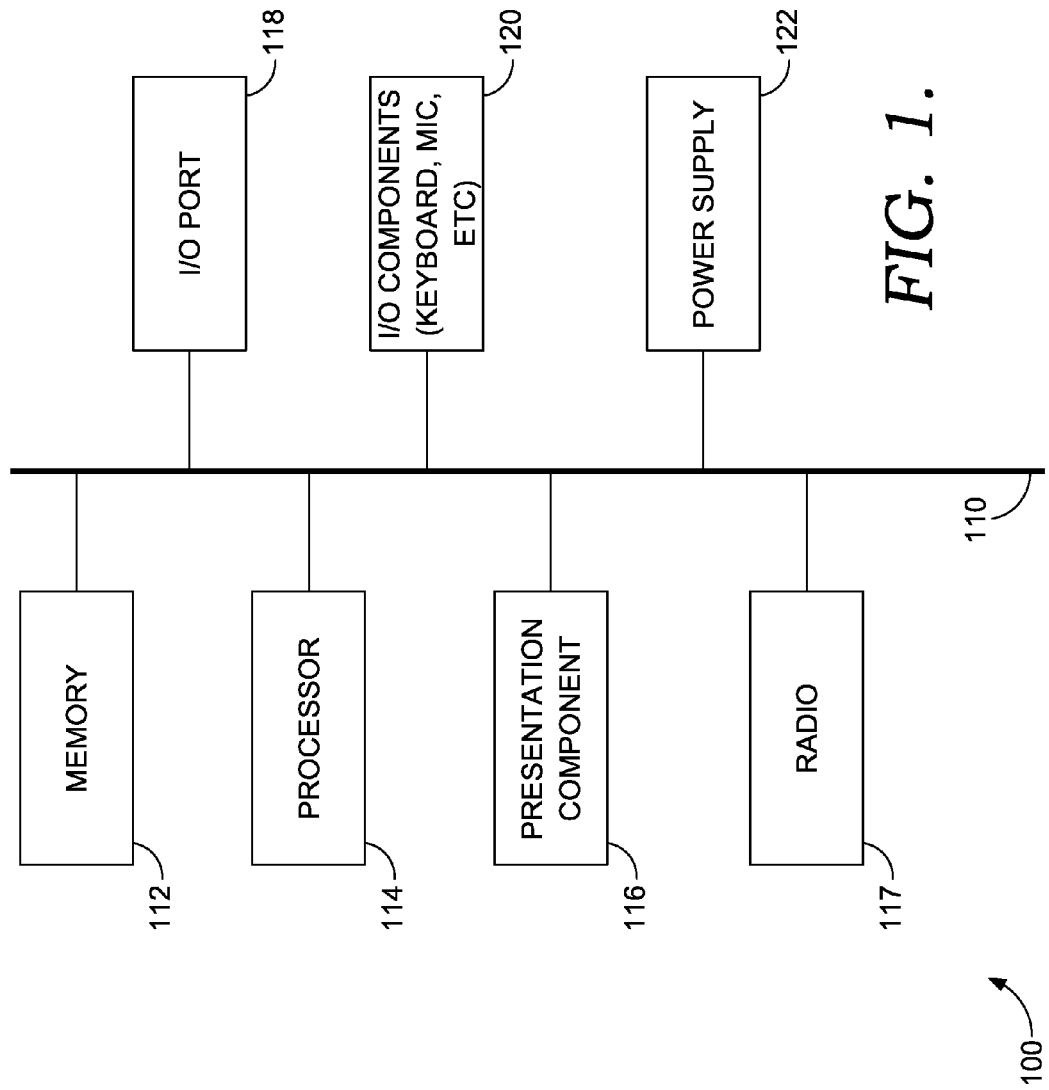
FIG. 1 is a block diagram depicting a mobile device in accordance with an embodiment of the present invention.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

The mobile device industry is moving toward building more phones which are based on a full touch-activated user interface instead of a traditional mobile device with physical keys and a small screen. A touch-activated user interface provides a graphical display, such as an LCD display, that is able to detect the location, and in some cases the motion, of a touch input provided by a user. Typical examples of touch input include tapping, writing, or drawing on the user interface with a stylus or one or more fingertips. Various technologies are employed to detect touch input. One technology detects changes in resistivity due to the pressure of the touch. Another technology measures changes in capacitance due to the conductivity of a human fingertip that touches the user interface.

Figure 8:
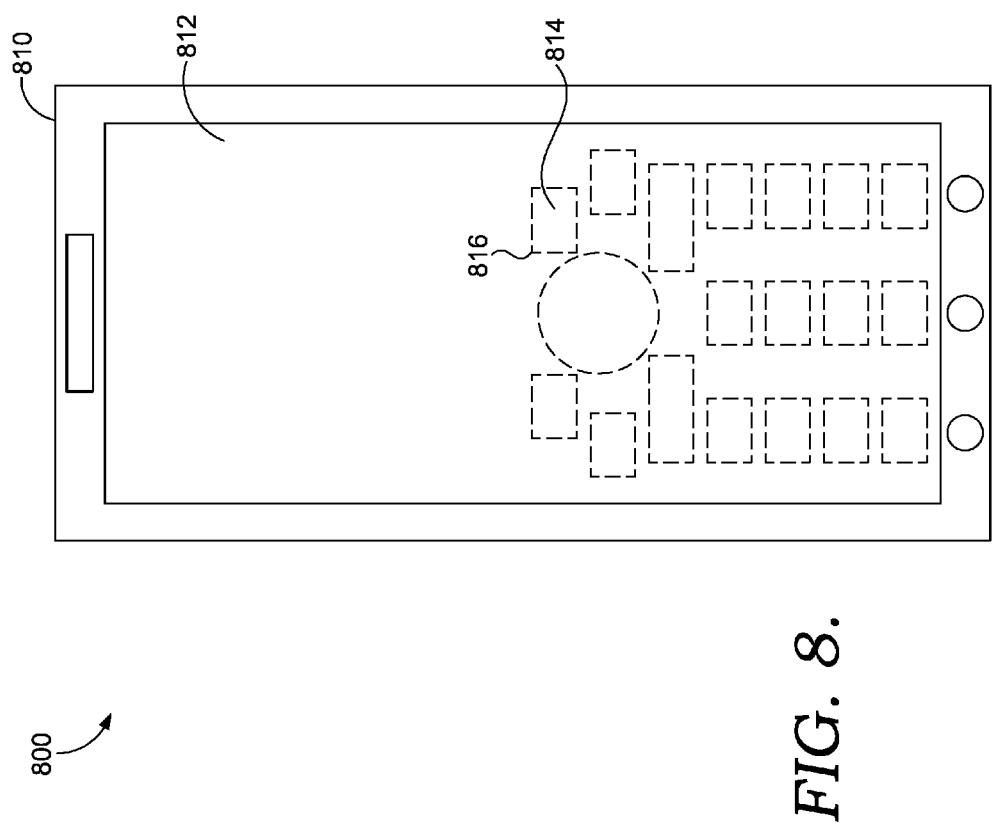
FIG. 8 depicts a mapping of touchscreen regions in accordance with an embodiment of the present invention.

A touch-activated user interface such as a touchscreen makes it possible to eliminate mechanical keys, not only eliminating a potential source of mechanical/electrical failure, but also enabling a mobile device to reconfigure its user interface for different applications or different screens within an application. Although an entire touchscreen may potentially be capable of receiving touch input, the mobile device is capable of restricting touch input to mapped regions of the touchscreen by simply ignoring unmapped regions. FIG. 8 depicts exemplary mapped touch regions on a touchscreen and is generally referred to as touchscreen mapping 800. Touchscreen mapping 800 includes a mobile device 810, of which touchscreen 812 is a part, touch regions 814, and a vertex 816 of the boundary of a touch region 814.

The boundaries of mapped touch regions 814 are indicated on touchscreen 812 by dashed lines for illustration purposes only. In an embodiment, the device may display an image of a traditional keypad having separate "keys" displayed, with each "key" positioned on the screen so as to coincide with an associated mapped region. Touch input from the region of each "key" is interpreted as though it was input from a key on a mechanical keypad.

FIGS. 2A, 2B, and 2C depict a system in accordance with an embodiment of the present invention. The system is generally referred to herein as system 200. Initially, system 200 includes a mobile device 210 and an overlay 212. Mobile device 210 includes a user interface 214 which, in some embodiments, is a touchscreen, as previously described. FIG. 2A illustrates the system 200 before the overlay 212 is secured to the mobile device 210. FIG. 2B illustrates one example as to how the overlay 212 may be secured to the mobile device 210. Other methods of securing the overlay 212 to the mobile device 210 are contemplated to be within the scope of the present invention. Further, FIG. 2C illustrates the overlay 212 after it has been placed on or secured to the mobile device 210.

As used herein, an overlay is a frame that can be secured to the mobile device and that covers at least a portion of the mobile device's user interface. The frame may comprise a front portion, a back portion, and side portions. The front portion of the overlay has one or more input areas that allow a user to input data into the mobile device. As mentioned, these input areas may be openings or may be physical keys. The overlay can be detached or removed from the mobile device when, for instance, the user wants to use the mobile device without an overlay or wants to use a different overlay. When the input areas are physical keys, data may be input into the mobile device using various methods. For instance, the back portion of the physical keys may make physical contact with the user interface, thus allowing the input of data into the mobile device. The back portion of the physical keys may include physical touch mechanisms that actuate the user interface and correspond in location to the input areas on the front portion of the overlay. Alternatively, data may be input into the mobile device by way of a conductive path between a user and the user interface of the mobile device via the physical keys. When the input areas are openings, portions of the user interface can be directly viewed by the user through the openings. With openings, the user makes direct physical contact with the user interface of the mobile device when inputting data into the mobile device via the overlay.

As mentioned, the overlay may also include side portions. The side portions of the overlay, in one embodiment, may function as a securing mechanism that allow for the overlay to be secured to the mobile device such that when secured, the overlay stays in place relative to the mobile device. In one embodiment, the overlay is secured to the mobile device by setting it on the front portion (e.g., user interface) of the mobile device so that it is parallel to the mobile device, and applying pressure to the overlay so that it snaps in place. Alternatively, the overlay may slide onto the mobile device from one or more of the top or bottom of the mobile device. Other securing methods are also contemplated to be within the scope of the present invention.

Returning to FIGS. 2A, 2B, and 2C, the mobile device 210 is capable of receiving configuration data associated with the overlay 212 such that the input areas on the user interface 214 can be modified to correlate with the input areas on the overlay 212. The overlay 212 includes one or more input areas 216. In the embodiment of FIGS. 2A, 2B, and 2C, the one or more input areas 216 are openings so that when the user inputs data into the mobile device, the user makes direct physical contact with the user interface 214 through the openings in the overlay 212. For example, the user uses the overlay 212 as a guide as to where the user's finger should be placed when inputting data into the mobile device, as the user's finger will physically touch the user interface 214 when using the overlay 212 in the embodiment of FIG. 2. The input areas 216 in FIG. 2 function as guides that provide a tactile indication of the boundaries of input regions. In an embodiment, input areas 216 are aligned with key images on the user interface 214 such that a user is able to touch a displayed key through an opening of the overlay 212. Overlay 212 is illustrated for exemplary purposes only, and is not meant to limit the embodiments of the present invention. It is contemplated herein that an overlay may take other forms that provide tactile feedback to a user when using a user interface, such as a touchscreen.

Figure 3A:
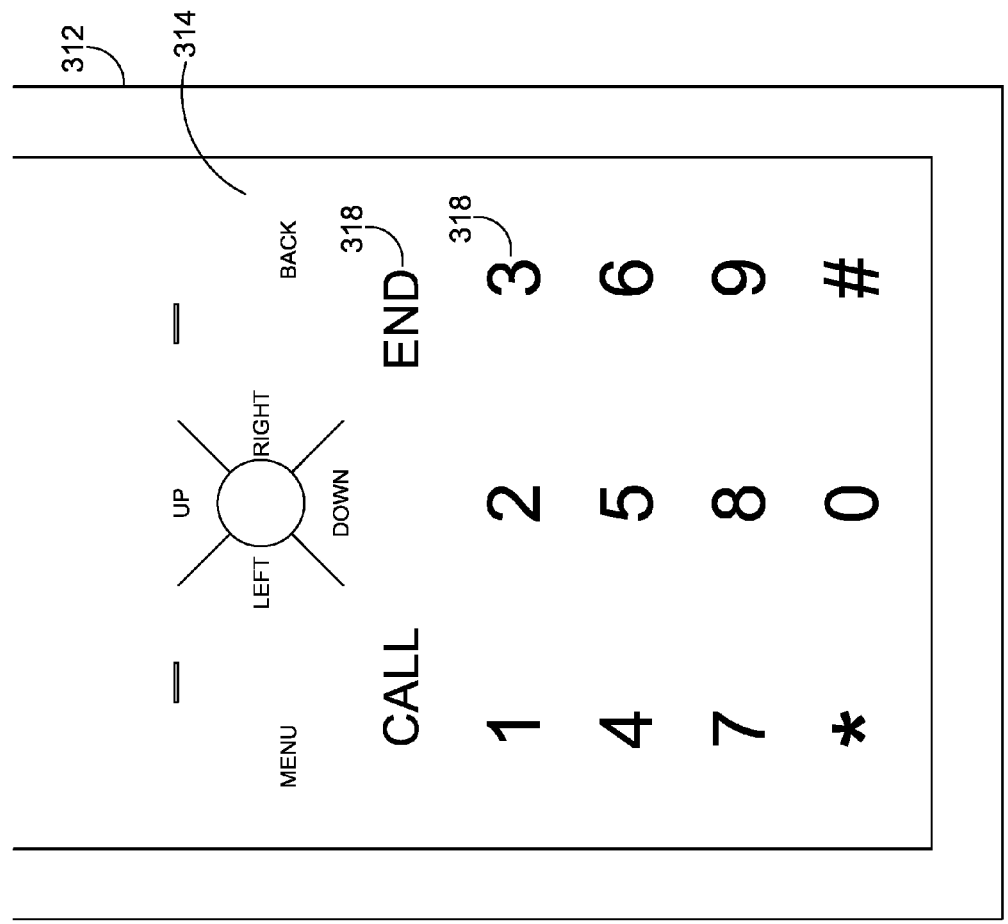
FIG. 3A depicts a system including a mobile device and an attached overlay in accordance with an embodiment of the present invention.

FIG. 3A depicts an exemplary mobile device with a user interface displaying an image of a traditional keypad and is generally referred to as mobile device with user interface 300. Mobile device with user interface 300 includes a mobile device 312, a user interface 314, and key images 318 that are displayed on the user interface 314. In one embodiment, the user interface 314 is a touchscreen. As such, in an embodiment, touching the numeral "3" region key image 318 of user interface 314 would cause an input to be provided to an application running on mobile device 300, just as if the user had pressed a numeral "3" key on a traditional mechanical keypad. In a different application, mobile device 300 may display a completely different set of keys on user interface 314, or may display other types of inputs that do not represent a mechanical keypad, such as displaying images that change or otherwise respond to a touch input.

Figure 3B:
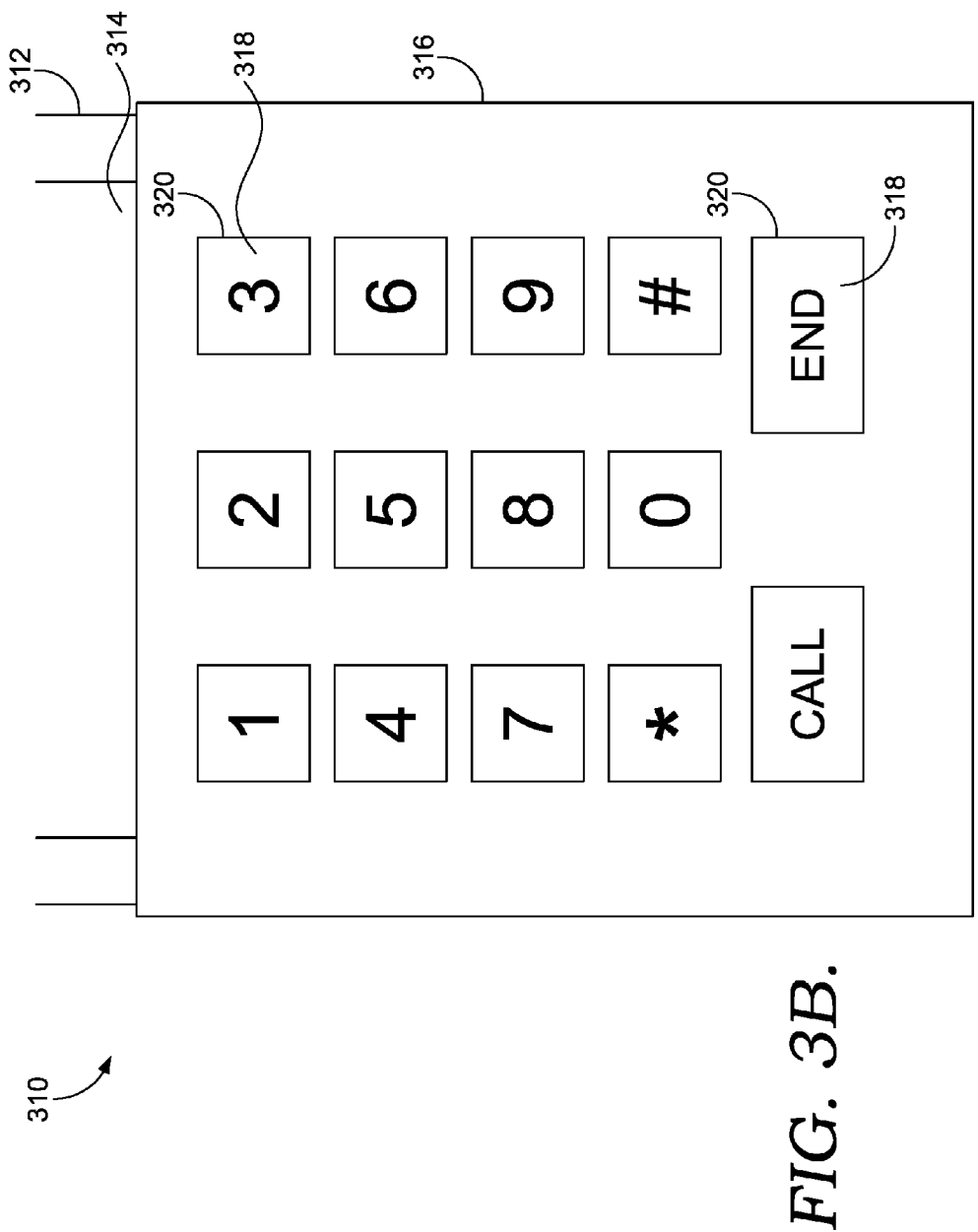
FIG. 3B depicts a user interface and an attached overlay in accordance with an embodiment of the present invention.

FIG. 3B depicts an exemplary system including a mobile device and an attached overlay. The system is generally referred to as system 310, which includes a mobile device 312, a user interface 314 associated with the mobile device 312, and an overlay 316. As shown here, the overlay 316 covers at least a portion of the user interface 314. The user interface 314 includes key images 318 similar to those shown in FIG. 3A. The difference here is that the key images 318 are shown through the input areas 320, which in FIG. 3B are openings. The openings allow a user to directly view and physically touch the user interface 314 through the overlay 316. Further, the openings, as shown in FIG. 3B act as guides for the user's finger to input data into the mobile device 312. While the input areas 320 shown here are openings, in an alternative embodiment, the input areas 320 are physical keys on the overlay 316 such that the user's finger would not make direct contact with the user interface 314, but instead the bottom of the physical keys would make contact with the user interface 314. This may be through physical (touch) or conductive means.

Figure 9:
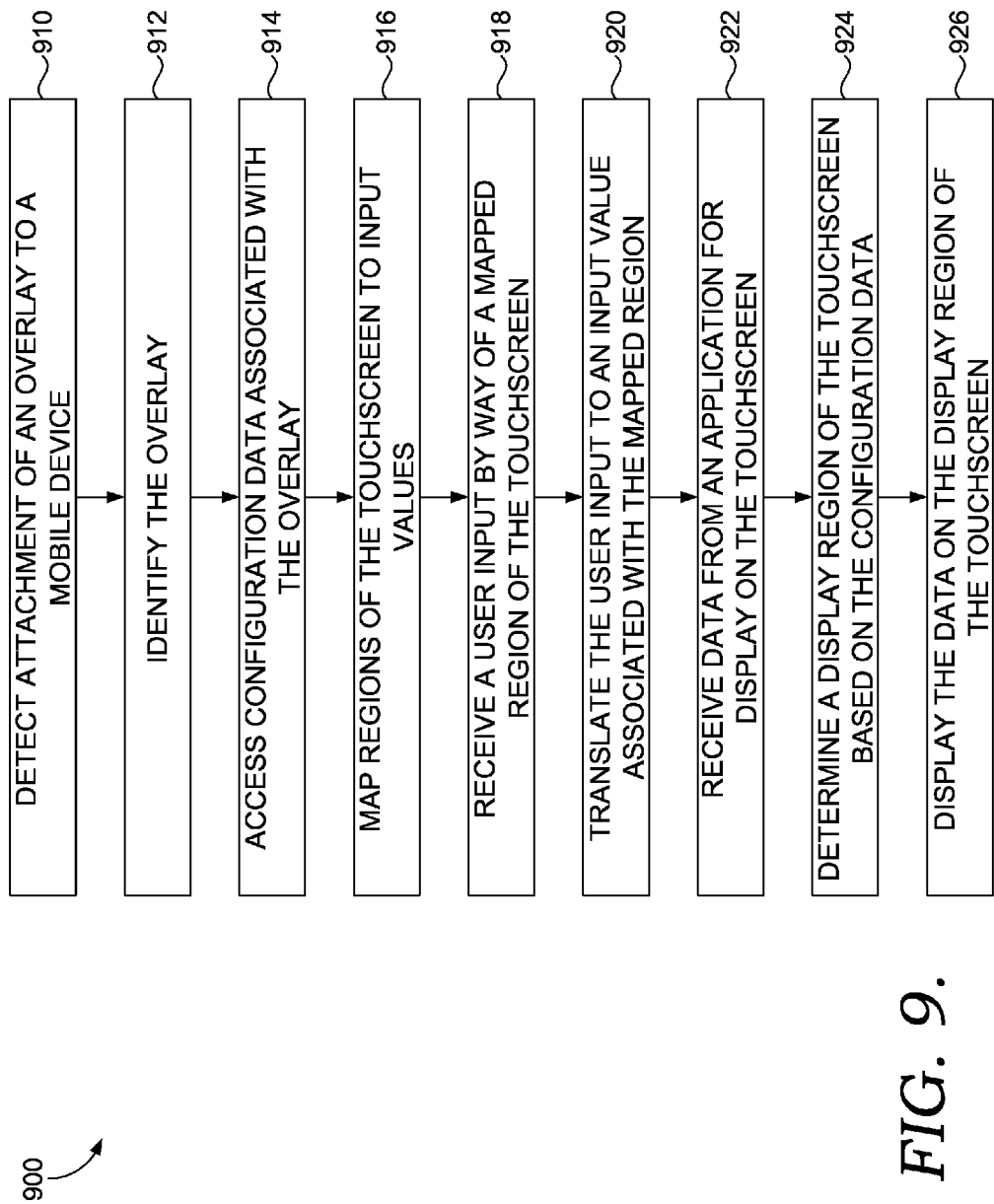
FIG. 9 is a flowchart of a method for interpreting input to a mobile device in accordance with an embodiment of the present invention.

In one embodiment, the mobile device includes a detection system, which is described in more detail in relation to FIG. 9. The detection system detects, in some way, that a particular physical overlay is being used and modifies the input regions on the user interface, based on the configuration data, to correspond with the one or more openings or physical keys on the physical overlay. Alternative to a detection system is a system where the user provides the mobile device with the information it needs regarding the overlay such that the mobile device can retrieve the configuration data in some way, such as via the Internet or a database. Other methods are described herein, and are contemplated to be within the scope of the present invention.

As shown, the configuration of key images 318 in FIG. 3A without the overlay 316 is different from the configuration of the key images 318 in FIG. 3B with the overlay 316. The difference in the configuration of the key images 318 between FIGS. 3A and 3B illustrates how the use of an overlay may modify the configuration or location of key images on the user interface of a mobile device. While the "END" key image is illustrated above the numbers in FIG. 3A, the "END" key image is illustrated below the numbers in FIG. 3B. As further described herein, the mobile device 312 receives configuration data associated with the overlay 316. The configuration data may include, for exemplary purposes only, one or more applications with which the overlay 316 is to be used, and location information regarding the location of each of the input areas on the overlay, whether the input areas are openings, such as in FIGS. 3A and 3B, or whether they are physical keys. As such, regardless of the configuration of the key images on the user interface, this configuration may change based on the configuration data associated with the overlay. In one embodiment, the number of key images required for use with a particular overlay may be different than what is normally shown on the user interface of the mobile device. Alternatively, the types of key images (e.g., buttons, directional indicators, sliders) may differ between those normally shown on a user interface of a particular mobile device and those used by a particular overlay. Overlays may be used for a number of different purposes, including to provide appropriate input areas for a particular application available on the mobile device, such as a gaming application.

FIGS. 4A, 4B, and 4C depict a system in accordance with an embodiment of the present invention, generally referred to as system 400, that includes a different type of overlay than that illustrated in FIGS. 2A, 2B, and 2C. FIG. 4A illustrates the overlay 412 before it is secured to the mobile device 410. FIG. 4B illustrates the overlay 412 being secured to the mobile device 410. FIG. 4C illustrates the overlay 412 once it is secured to the mobile device 410. System 400 includes a mobile device 410 and an overlay 412. Mobile device 410 includes a user interface 414. Overlay 412 includes input areas 416 that mimic the look and feel of mechanical keys on a traditional keypad. In an embodiment, input areas 416 are aligned with key images on the user interface. For instance, for input area "0" on the overlay 412, there is a corresponding key image on the user interface 414 that may be located directly beneath the input area 416 when the overlay 412 is secured to the mobile device 410. Here, input areas 416 function as guides that provide a tactile indication of the locations of input regions on the user interface 414 such that when the user presses or otherwise selects a particular input area 416, the user's touch is transmitted to a corresponding mapped region of the user interface 414. Overlay 412 is illustrated for exemplary purposes only, and is not meant to limit the embodiments of the present invention. It is contemplated herein that an overlay may take other forms that provide tactile feedback to a user when using a user interface, such as a touchscreen.

Overlays, such as overlay 212 of FIG. 2A and overlay 412 of FIG. 4A need not be designed to match whichever "keypad" happens to be displayed on a user interface. In an embodiment, a mobile device reconfigures the information displayed on the user interface, as well as the mapped regions, to align with the input areas on the overlay. Thus, the input touch regions that are displayed when an overlay is secured to the mobile device may be in completely different locations, or may even be completely different types of inputs (e.g., a "slider" versus a "key"). Likewise, the input touch regions that are displayed when one overlay is attached may be completely different than the input touch regions that are displayed when a different overlay is secured to the mobile device. Accordingly, an overlay may be used to reconfigure the user interface for a particular application with which it is associated, or for a particular user's preference. This is illustrated in FIGS. 3A and 3B as described above, where the configuration of the key images in FIG. 3B with the overlay 316 has changed with respect to the configuration of key images in FIG. 3A without the overlay 316.

Figure 5:
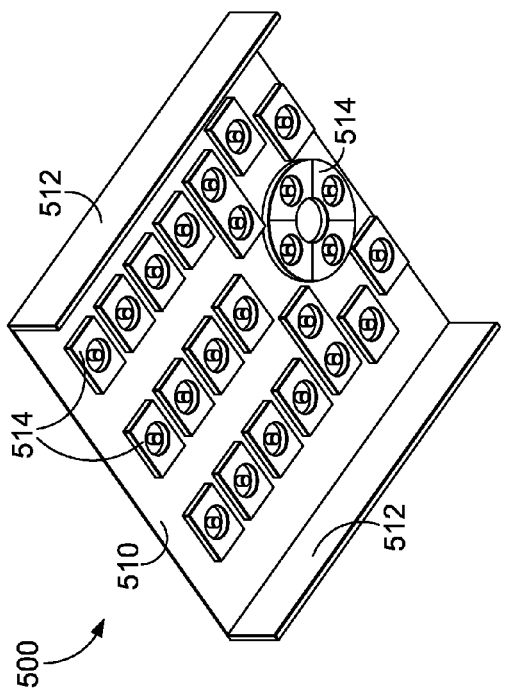
FIG. 5 depicts a view of an overlay in accordance with an embodiment of the present invention.

Turning now to FIG. 5, a bottom view of an overlay 500 is illustrated, in accordance with an embodiment of the present invention. The overlay of FIG. 5 includes a back portion 510, side portions 512, and bottom views of input areas 514, which in the embodiment of FIG. 5 are physical keys as opposed to openings. As shown, when physical keys are used, there is a physical contact or physical touch mechanism on the underside of each input area that makes contact with the user interface when selected or pushed by a user. The act of a user pushing an image area on the overlay 510 actuates the user interface, as opposed to a human finger when an overlay is not used. The physical touch mechanism as shown in FIG. 5 is just one example, as it is contemplated that other physical touch mechanisms may also be used to actuate the user interface. Alternative to the physical touch mechanism is the use of a conductive path from the user's finger touching the top of the input area of the overlay to the user interface of the mobile device itself. The details of each of the bottom side of the input areas will be discussed in greater detail in FIG. 6B.

Figure 6A:
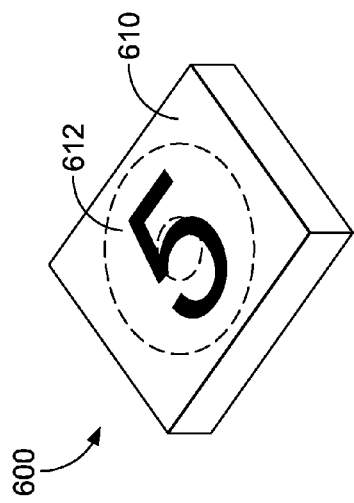
FIGS. 6A and 6B depict two views of an input area of an overlay in accordance with an embodiment of the present invention.

Referring to FIG. 6A, a top view is shown of an input area 600, in accordance with an embodiment of the present invention. The input area 600, in FIG. 6A, is a physical key and has a top portion 610 and a graphic 612. The graphic 612 may be a letter, a number, a symbol (e.g., an arrow), a word, a phrase, etc. Here, the number "5" is illustrated as the graphic 612 on the input area 600 and is shown for exemplary purposes only. The graphic 612 provides an indication to the user as to what the user is selecting or pressing when using the overlay. As mentioned, the mobile device modifies its user interface to correspond with the configuration data associated with the particular overlay being used. As such, when the user selects the input area 600 shown in FIG. 6A, the mobile device will interpret that input as the number "5."

Figure 6B:
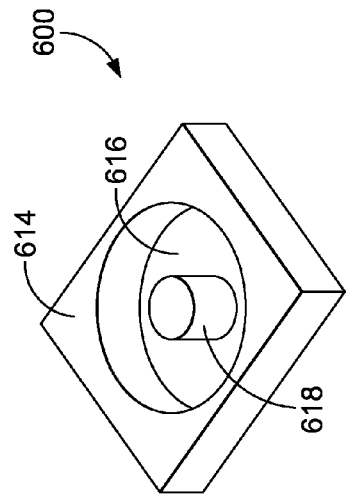

FIG. 6B illustrates a bottom view of an input area 600, in accordance with an embodiment of the present invention. FIG. 6B illustrates the bottom side 614 of an input area 600. As shown, an inside portion 616 and a physical touch mechanism 618 are included on the bottom side 614 of the input area 600. This is only one way that the bottom side of an input area may be configured out of many, and as such, others are also contemplated to be within the scope of the present invention. In embodiments, when a user presses (e.g., puts pressure) on the input area 600, this causes the physical touch mechanism 618 to move downward because of the pressure on the input area such that the physical touch mechanism 618 makes physical contact with the user interface of the mobile device. As mentioned, the physical touch mechanism 618 in some embodiments acts as a conductive path between the user's finger and the user interface. In one embodiment, the inside portion 616 is indented, which allows light to travel from the user interface, through the physical key so that the user can view the overlay when light is not otherwise available. In one embodiment, the bottom side 614 of the input area 600 is capable of working with multiple touch technologies, including pressure and capacitive. Both are described in further detail herein.

Figure 7A:
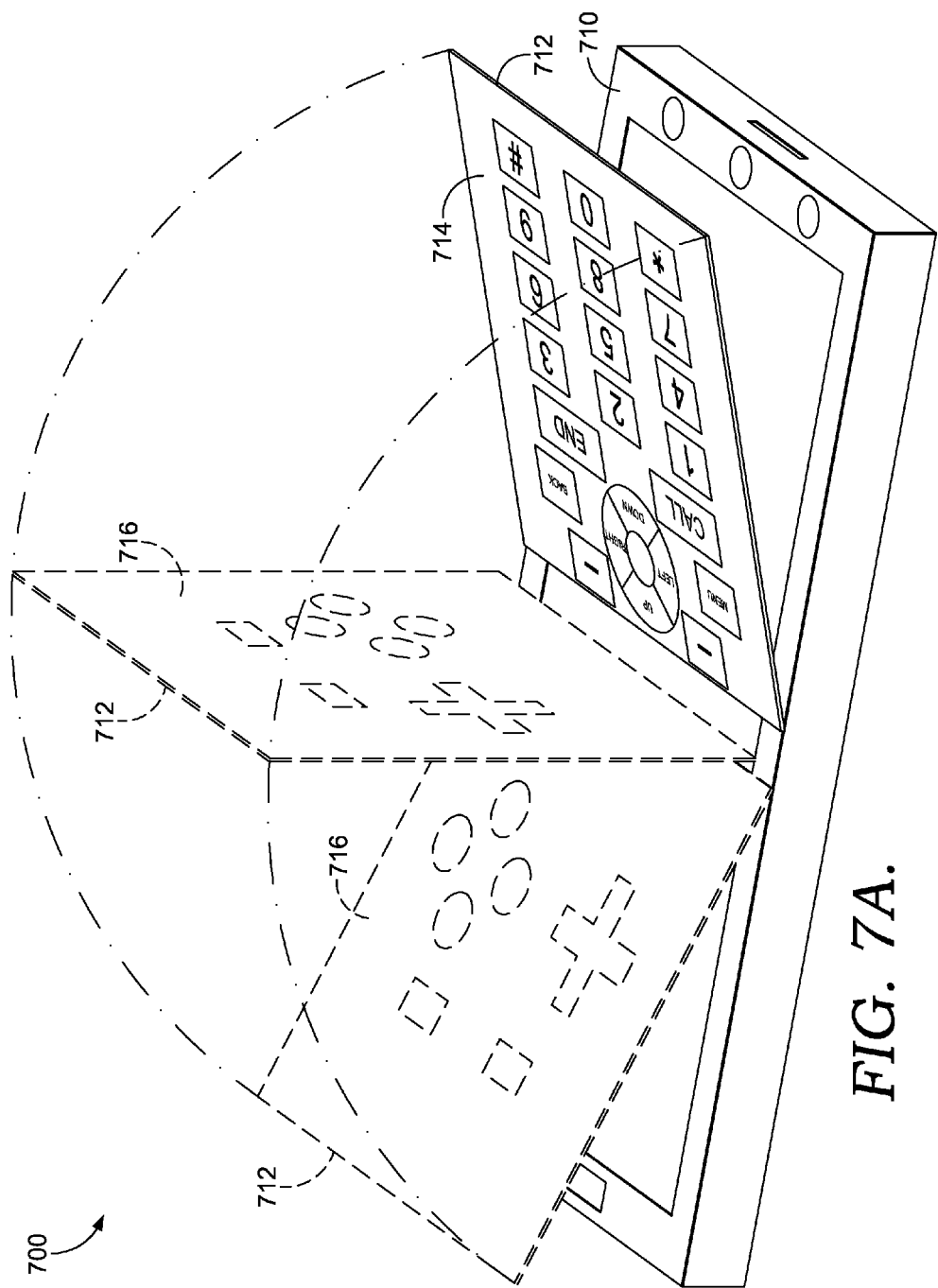
FIGS. 7A and 7B depict a mobile device with an overlay in accordance with an embodiment of the present invention.

Turning now to FIG. 7A, a mobile device having an overlay is illustrated, in accordance with an embodiment of the present invention. Collectively, the system of FIG. 7A comprising a mobile device 710 and an overlay 712 is referred to herein as system 700. In some embodiments of the present invention, such as that illustrated in FIG. 7A, the overlay 712 has a dual function in that it has a different configuration of input areas on one side than the other such that it can be used in multiple ways. Even still, the overlay 712, as shown here, can be used on different portions of the mobile device 710 such that it provides a different experience to the user. As shown in FIG. 7A, the overlay 712 has a front side 714 and a back side 716, the back side only being visible when the overlay 712 is turned over, as indicated by the broken lines. In one instance, the overlay 712 can be used on a bottom portion of the mobile device 710, and can be flipped over, such as if it were on a hinge, and used on the top portion of the mobile device such that the front and back sides of the overlay 712 have a different configuration of input areas. For exemplary purposes only, a first side of an overlay may be used on the bottom portion of a mobile device and may be used as a traditional phone keypad, but may be flipped over and used on the top portion of a mobile device and may function as a specialized game keypad. Alternatively, an overlay having a different configuration of input areas on its front and back sides may be used on the same portion of the mobile device, whether the overlay is on its front or back side.

Figure 7B:
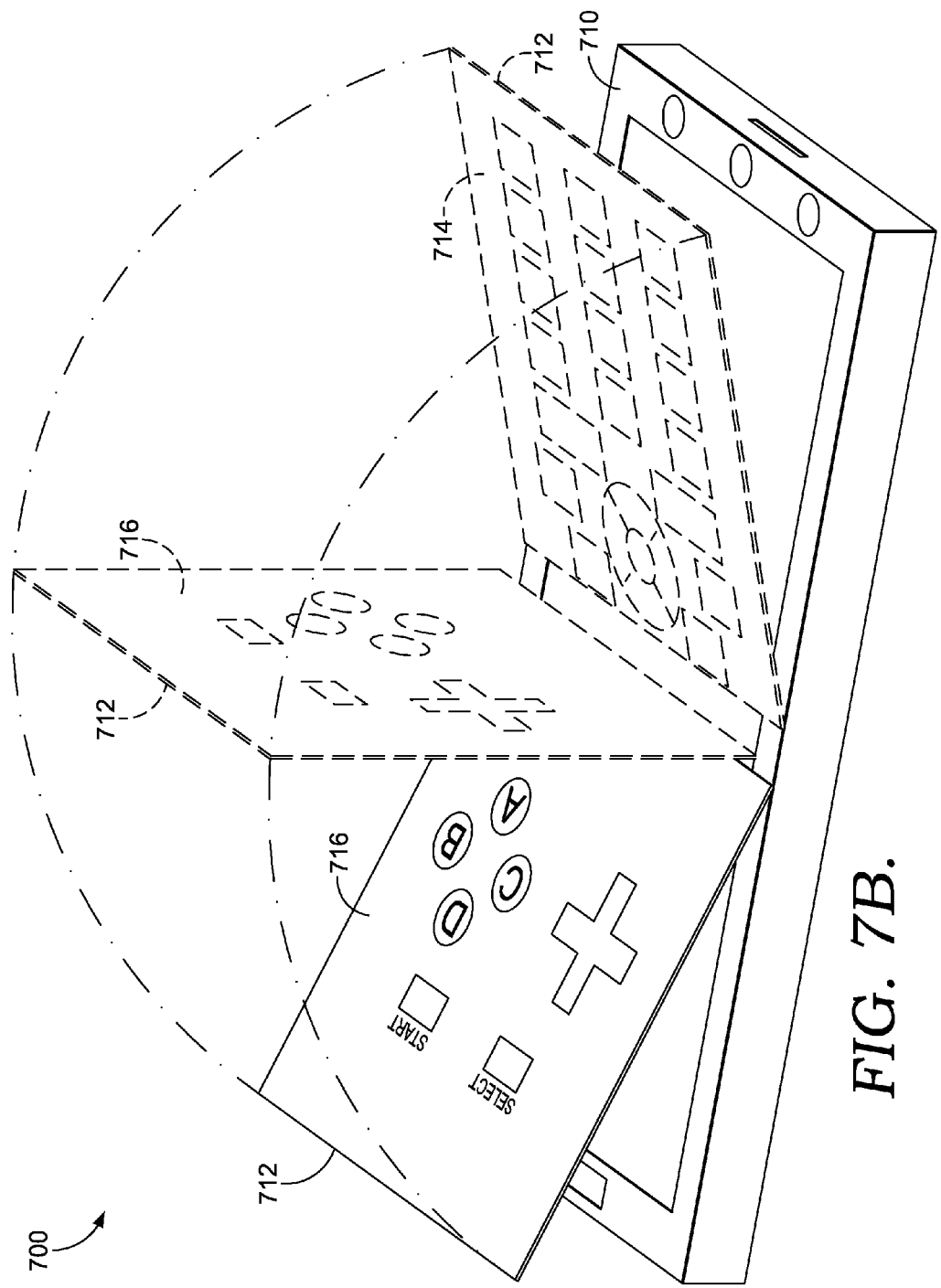

FIG. 7B illustrates the same overlay 712 as shown in FIG. 7A, but illustrates in solid lines the back side 716 of the overlay 712. As shown here, the back side 716 of the overlay 712 may be used for a gaming application or other specialized application, while the front side 714 may be used as a traditional keypad for the mobile device 710. The input areas shown in the embodiments of FIGS. 7A and 7B are physical keys. While physical touch mechanisms are not shown here, this embodiment contemplates that another mechanism is used to transfer the user's desire to input certain data from the overlay to the mobile device. For example, the overlay 712, instead of being constructed from a harder type of material, such as plastic, may be constructed from a softer material, such as a soft plastic or rubber such that when an overlay has different input area configurations on its front and back sides, the physical touch mechanisms shown in previous figures herein would not be necessary. When a user's finger presses or puts pressure on a particular input area, this pressure would cause the underside of the input area to make direct contact with the user interface, thus transferring the user's intended data input from the overlay into the mobile device.

Referring now to FIG. 9, a method 900 is depicted for interpreting input to a mobile device in accordance with an embodiment of the present invention. When a user secures an overlay to a mobile device, the device detects the presence of the overlay at a step 910. Detection of the overlay may be performed using various methods. For example, the overlay may incorporate an RFID device that interacts with the mobile device to notify the device that the overlay has been installed. Other methods of interaction between an overlay and a device include Bluetooth, which is becoming a common feature of mobile devices, or a barcode on the overlay that is readable by the device using the device's camera. Lower-cost methods may be used as well. An overlay may be designed to physically activate electrical contacts on the exterior of a device when installed. Alternatively, a user may select a menu function or provide other touch input that notifies the device that an overlay is, or is about to be, installed.

At a step 912, the mobile device identifies the overlay. In an embodiment, the overlay has an activation zone, an existing "button area" or input area, which corresponds to an activation zone on the device's user interface, and serves a special function during the identification process. The purpose of the activation zone is to identify to the mobile device what type of overlay is being used. When the overlay is attached to the device, the user is responsible for pressing/activating this zone when prompted. For example, on one overlay the activation zone may be mapped to "keys" 1, 2, and 3, and the device prompts the user to press the "keys" in a specified order. On an overlay having a different layout, the activation zone may be mapped to "keys" corresponding to different regions of the user interface. When the user presses or activates the regions as directed, the mobile device is able to identify the particular overlay based on the regions of the user interface that are activated by the user. The location of the activation zone and/or the sequence of the "keys" uniquely identifies an overlay as having a specific layout of input areas. In this way, the layout and functions of the input areas can be tailored for a specific application. For example, a game application may use a completely different configuration of the user interface than a web-browsing application would use.

At a step 914, the mobile device accesses configuration data that is associated with the overlay, based on the identity of the overlay. Configuration data for known overlay configurations is stored and maintained locally on the mobile device and/or remotely on one or more servers or storage devices. The configuration data is stored such that it is searchable based on the identity of an overlay. Exemplary types of storage include databases and spreadsheets. In an embodiment, the configuration data for a given overlay includes a list of touch regions and their locations on the user interface and/or the overlay itself. As described above, FIG. 8 illustrates exemplary mapped touch regions 814.

The locations and boundaries of the touch regions may be defined using X and Y coordinates with respect to the user interface, such that position is indicated in terms of a number of pixels along each axis of the user interface. A touch region may then be defined in terms of the X,Y coordinates of its vertices or points along its boundaries. For example, vertex 816 of touch region 814 may be located at pixel 300 along the X axis and pixel 600 along the Y axis.

Alternatively, rather than using absolute coordinates, locations and boundaries of touch regions may be defined using relative measurements that are independent of the size of the user interface. For example, vertex 816 of touch region 814 may be located along the X axis at 70% of the length of the X axis, and located along the Y axis at 50% of the length of the Y axis. In that way, the same configuration data may be used on different sizes of user interfaces, as long as the relative mapping is the same. Other coordinate or measurement systems may also be used to define the mapping of the touch regions.

In an embodiment, the configuration data also includes visual representations of the touch regions, for example, a graphic representation for a "key" that represent the numeral "2" key on a keypad. In an embodiment, the overlay configuration data may include only a style sheet if "standard" user interface elements are used, for example, a style may determine the color of the background and foreground of the numbers 0-9 for a normal keypad. The configuration data may also assign the inputs associated with the touch regions, for example, the input for the numeral "2" region is assigned an input value that corresponds to the numeral "2" on a traditional keypad. Other types of input values may also be assigned that correspond to functions other than numeric entries, including increment/decrement functions of arrow keys.

At a step 916, regions of the user interface are mapped to input values based on the configuration data. In an embodiment, mapping regions of the user interface includes generating a mapping based on the configuration data. In another embodiment, mapping regions of the user interface includes utilizing a mapping that already exists in the configuration data.

At a step 918, user input is received by way of one of the mapped regions of the user interface. For example, a user may activate the touch region corresponding to the numeral "2." In an embodiment, the input from the user interface takes the form of values representing X and Y coordinates of an activated point (or points) on the user interface. In another embodiment, the values may represent measurements of electrical signals from the user interface, in which case processing is required to convert them into X and Y coordinates.

Figure 10:
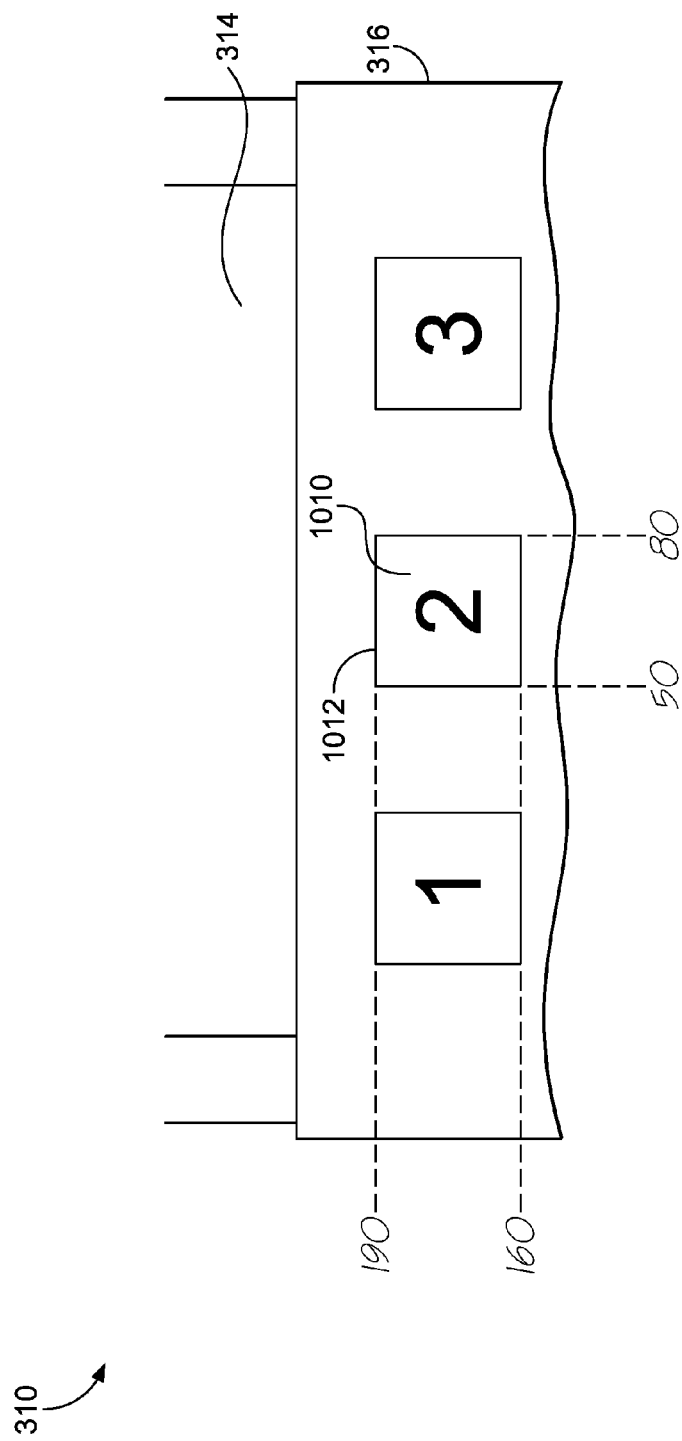
FIG. 10 depicts a touchscreen and an attached overlay in accordance with an embodiment of the present invention.

At a step 920, the user input is translated to an input value associated with the touch region from which the user input originated. In an embodiment, when the user input consists of X and Y coordinates of a region on the user interface, an input value associated with that region can be determined based on the mapping generated from the configuration data. X and Y coordinates may be specified in various ways. Exemplary X and Y coordinates are illustrated in FIG. 10. FIG. 10 depicts a portion of system 310 of FIG. 3B. The numerals "50" and "80" represent pixel coordinates along the X axis of user interface 314. The numerals "160" and "190" represent pixel coordinates along the Y axis of user interface 314. In an embodiment, the border of a square touch region 1010 associated with the numeral "2" is aligned with the border of a square cutout 1012 in overlay 316. The vertices of touch region 1010 are located at the X,Y coordinate pairs (50,80) (80,160)(80,190)(50,190). Thus, when the user touches the numeral 2, the user input received at step 918 includes one or more X,Y coordinate pairs that are located within the touch region defined by the X,Y coordinate pairs (50,80)(80,160) (80,190)(50,190). Determining the location of the user input in relation to the mapping enables the user input to be translated into the numeral "2." The input value "2" (or a corresponding numeric value such as an ASCII code) is then provided to an application that is processing the input values.

At a step 922, data is received from the application for display on the user interface. For example, the user activates one or more regions of the user interface to select a stored photograph to be displayed. Once the user input has been translated into input values and provided to an image application associated with retrieval of stored images, the data that constitutes the selected image is received from the image application.

At a step 924, the mobile device determines an available display region of the user interface, based on the configuration data. Continuing with the example of a selected image, the image may be rectangular in shape, with a landscape orientation. Such an image is depicted in FIG. 2A, where an image is displayed on the entire user interface 214 with no overlay attached to mobile device 210. In the present example, however, an overlay is attached to the mobile device, as depicted in FIG. 2C. In an embodiment, the region of the user interface available for display is limited to the portion of user interface 214 that is not covered by overlay 212.

At a step 926, data received from the image application is displayed in the available display region. In an embodiment, the size and location of the available display area constrains how the image is displayed. Continuing with the example above, the image depicted in FIG. 2C is scaled to a smaller size to fit into the available display area, as compared with the depiction of the image in FIG. 2A. In one embodiment, the image application determines the available display area, based on the configuration data, and adapts the displayed image accordingly. In another embodiment, the image application is unaware of the available display area, and the mobile device (or another application on the device, e.g., an operating system) performs the functions of orienting and sizing the displayed image on behalf of the image application.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed by a processor, perform a method for interpreting input that is provided to a mobile device by way of a user interface of the mobile device, the method comprising:
    identifying a physical overlay ("overlay") that is placed over a portion of the user interface;
    based on an identity of the overlay, accessing configuration data that is associated with the overlay, wherein the configuration data defines locations of input areas on the overlay;
    upon accessing the configuration data associated with the overlay:
        directing the user to activate one or more particular areas of the touchscreen, wherein activation of the one or more particular areas is uniquely associated with the configuration data associated with the overlay,
        receiving input from the activation, and
        verifying that the input from the activation corresponds to the identity of the overlay such that the overlay is validated; and
    based on the configuration data, mapping input regions of the user interface to input values such that when a user provides touch input via one of the input regions, an input value associated with the input region is received by the mobile device, wherein a location of the input region corresponds to a location of one of the input areas of the overlay.

2. The media of claim 1, the method further comprising based on the configuration data, mapping output data to an output region of the user interface such that the output data is displayed within the output region of the user interface.

3. The media of claim 1, wherein the overlay provides physical representations of the input regions of the user interface.

4. The media of claim 3, wherein the physical representations of the input regions provide the user with tactile indications of the input regions.

5. The media of claim 1, wherein the input value is associated with a keypad function.

6. The media of claim 5, wherein the keypad function is activated upon the input value being received by the mobile device.

7. The media of claim 2, wherein the output region of the user interface corresponds to a portion of the user interface that is not obscured by the overlay.

8. The media of claim 7, wherein the output data is formatted for display within the output region based on the configuration data that is associated with the overlay.

9. A system for interpreting input that is provided to a mobile device by way of a touchscreen of the mobile device, the system comprising:
    an overlay that includes a plurality of input areas, wherein the input areas facilitate user interaction with a user interface that is provided by way of the touchscreen, wherein the input areas facilitate user interaction by physically indicating locations of specific regions of the touchscreen, wherein specific functions are associated with the specific regions of the touchscreen;
    a mobile device that is configured to
        (A) identify the overlay that is placed over a portion of the touchscreen,
        (B) access configuration data associated with the overlay, based on an identity of the overlay,
        (C) upon accessing the configuration data associated with the overlay, direct the user to activate one or more particular areas of the touchscreen, wherein activation of the one or more particular areas is uniquely associated with the configuration data associated with the overlay,
        (D) receive input from the activation, and
        (E) verify that the input from the activation corresponds to the identity of the overlay such that the overlay is validated,
        (F) map a region of the touchscreen to an input value, based on the configuration data, and
        (G) map output data to a region of the touchscreen.

10. The system of claim 9, wherein identifying the overlay includes receiving user input that identifies the overlay.

11. The system of claim 9, wherein identifying the overlay includes receiving input from the overlay that identifies the overlay.

12. The system of claim 9, wherein the configuration data defines the associations between the specific functions and the specific regions of the touchscreen.

13. The system of claim 9, wherein mapping output data to the region of the touchscreen includes determining the region of the touchscreen that is available to display the output data, based on the configuration data associated with the overlay.

14. Non-transitory computer-readable media having computer-executable instructions embodied thereon that, when executed by a processor, perform a method for interpreting input that is provided to a mobile device by way of a touchscreen of the mobile device, the method comprising:
    detecting attachment of a removable overlay to the mobile device, wherein the overlay covers a portion of the touchscreen, and wherein the overlay includes input areas;
    identifying the overlay;
    accessing configuration data that is associated with the overlay, based on an identity of the overlay, wherein the configuration data defines mapped regions of the touchscreen, wherein each of the mapped regions is associated with at least one of a respective keypad input or a respective display region;
    upon accessing the configuration data associated with the overlay:
        directing the user to activate one or more particular areas of the touchscreen, wherein activation of the one or more particular areas is uniquely associated with the configuration data associated with the overlay,
        receiving input from the activation, and verifying that the input from the activation corresponds to the identity of the overlay such that the overlay is validated;

receiving a user input by way of one of the mapped regions of the touchscreen, wherein the mapped region corresponds to one of the input areas of the overlay;

based on the configuration data, translating the user input to the keypad input associated with the mapped region;

receiving, from an application, data for display on the touchscreen;

determining a display region of the touchscreen based on the configuration data, wherein the display region corresponds to a region of the touchscreen that is not obscured by the overlay; and displaying the data on the display region of the touchscreen.

15. The media of claim 14, the method further comprising providing the keypad input to the application.

16. The media of claim 14, wherein the input areas of the overlay physically delineate the mapped regions of the touchscreen.

17. The media of claim 16, wherein physically delineating a mapped region includes at least one of (A) providing a cutout area in the overlay that corresponds to the mapped region, or (B) providing a simulated button that generates a touch input in the mapped region when pressed by the user.

18. The media of claim 14, wherein the identity of the overlay is associated with a unique configuration of input areas such that any two overlays having identical configurations of input areas also have the same identity.

19. The media of claim 14, wherein locations and sizes of the mapped regions are relative to a size of the overlay.

* * * * *